(12) United States Patent
Iyigun et al.

(10) Patent No.: US 10,503,238 B2
(45) Date of Patent: Dec. 10, 2019

(54) THREAD IMPORTANCE BASED PROCESSOR CORE PARKING AND FREQUENCY SELECTION

(71) Applicant: Microsoft Technology Licensing, LLC, Redmond, WA (US)

(72) Inventors: Mehmet Iyigun, Kirkland, WA (US); Kai-Lun Hsu, Kirkland, WA (US); Rahul Nair, Bellevue, WA (US); Mark Allan Bellon, Seattle, WA (US); Arun U. Kishan, Kirkland, WA (US); Tristan A. Brown, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 248 days.

(21) Appl. No.: 15/608,712

(22) Filed: May 30, 2017

(65) Prior Publication Data

US 2018/0120920 A1 May 3, 2018

Related U.S. Application Data

(60) Provisional application No. 62/415,925, filed on Nov. 1, 2016.

(51) Int. Cl.
*G06F 1/32* (2019.01)
*G06F 1/3234* (2019.01)
(Continued)

(52) U.S. Cl.
CPC .......... *G06F 1/3243* (2013.01); *G06F 1/3203* (2013.01); *G06F 1/324* (2013.01);
(Continued)

(58) Field of Classification Search
None
See application file for complete search history.

(56) References Cited

U.S. PATENT DOCUMENTS 7,711,966 B2 5/2010 Prabhakaran et al.
8,010,822 B2 8/2011 Marshall et al.
(Continued)

FOREIGN PATENT DOCUMENTS

EP 2851796 3/2015
WO WO-2008022882 2/2008
(Continued)

OTHER PUBLICATIONS

"Non Final Office Action Issued in U.S. Appl. No. 15/439,684", dated Jan. 2, 2019, 8 Pages.
(Continued)

*Primary Examiner* — Danny Chan (57) ABSTRACT

Each processor core in a computing device supports various different frequency ranges, also referred to as p-states, and can operate to run threads at any one of those different frequency ranges. Threads in the computing device are assigned one of multiple importance levels. A processor core is configured to run at a particular frequency range or in accordance with a particular energy performance preference based on the importance level of the thread it is running. A utilization factor of a processor core can also be determined over some time duration, the utilization factor being based on the amount of time during the time duration that the processor core was running a thread(s), and also based on the importance levels of the thread(s) run during the time duration. The utilization factor can then be used to determine whether to park the processor core.

14 Claims, 6 Drawing Sheets

(51) Int. Cl.

| | | |
|---|---|---|
| *G06F 1/3203* | (2019.01) | |
| *G06F 9/22* | (2006.01) | |
| *G06F 9/38* | (2018.01) | |
| *G06F 9/50* | (2006.01) | |
| *G06F 1/324* | (2019.01) | |
| *G06F 9/30* | (2018.01) | |
| *G06F 9/46* | (2006.01) | |
| *G06F 1/3287* | (2019.01) | |
| *G06F 1/329* | (2019.01) | |

(52) U.S. Cl.
CPC ............ *G06F 9/226* (2013.01); *G06F 9/3009* (2013.01); *G06F 9/3851* (2013.01); *G06F 9/46* (2013.01); *G06F 9/505* (2013.01); *G06F 9/5094* (2013.01); *G06F 1/329* (2013.01); *G06F 1/3287* (2013.01); *G06F 9/5044* (2013.01); *Y02D 10/22* (2018.01)

(56) References Cited

U.S. PATENT DOCUMENTS

| | | | |
|---|---|---|---|
| 9,086,823 B2 | 7/2015 | Werner | |
| 9,377,842 B2 | 6/2016 | Koo et al. | |
| 2003/0028816 A1* | 2/2003 | Bacon | G06F 1/3203 |
| | | | 713/500 |
| 2004/0215987 A1 | 10/2004 | Farkas et al. | |
| 2006/0123251 A1 | 6/2006 | Nakajima et al. | |
| 2006/0282692 A1 | 12/2006 | Oh | |
| 2006/0294401 A1 | 12/2006 | Munger | |
| 2008/0127192 A1 | 5/2008 | Capps et al. | |
| 2008/0134191 A1 | 6/2008 | Warrier et al. | |
| 2008/0222466 A1 | 9/2008 | Gonzalez et al. | |
| 2009/0199019 A1 | 8/2009 | Hongisto et al. | |
| 2009/0288092 A1 | 11/2009 | Yamaoka | |
| 2009/0328055 A1* | 12/2009 | Bose | G06F 1/3203 |
| | | | 718/105 |
| 2010/0037038 A1 | 2/2010 | Bieswanger et al. | |
| 2012/0060170 A1 | 3/2012 | Vajda | |
| 2012/0173906 A1 | 7/2012 | Elnozahy et al. | |
| 2012/0227048 A1 | 9/2012 | Elnozahy et al. | |
| 2012/0284729 A1 | 11/2012 | Sharda et al. | |
| 2013/0191613 A1* | 7/2013 | Takahashi | G06F 15/76 |
| | | | 712/30 |
| 2013/0238912 A1 | 9/2013 | Priel et al. | |
| 2013/0246781 A1 | 9/2013 | Qi et al. | |
| 2014/0059262 A1 | 2/2014 | Davis et al. | |
| 2015/0012731 A1 | 1/2015 | Hum et al. | |
| 2015/0089249 A1* | 3/2015 | Hannon | G06F 9/5094 |
| | | | 713/300 |
| 2015/0286262 A1* | 10/2015 | Park | G05D 23/1917 |
| | | | 713/320 |
| 2015/0355705 A1* | 12/2015 | Weissmann | G06F 1/3287 |
| | | | 713/322 |
| 2016/0092274 A1 | 3/2016 | Singh et al. | |
| 2016/0210174 A1 | 7/2016 | Hsieh et al. | |
| 2016/0253217 A1* | 9/2016 | Shows | G06F 9/5088 |
| | | | 718/104 |
| 2016/0342191 A1* | 11/2016 | On | G06F 1/324 |
| 2017/0344099 A1* | 11/2017 | Qu | G06F 9/4401 |

FOREIGN PATENT DOCUMENTS

| | | |
|---|---|---|
| WO | WO-2011104245 | 9/2011 |
| WO | WO-2013169249 | 11/2013 |
| WO | 2015163897 A1 | 10/2015 |

OTHER PUBLICATIONS

"International Search Report and Written Opinion", Application No. PCT/US2017/058384, dated Feb. 9, 2018, 16 pages.

Kandhalu,"Energy-Aware Partitioned Fixed-Priority Scheduling for Chip Multi-processors", In Proceedings of IEEE 17th International Conference on Embedded and Real-Time Computing Systems and Applications, Aug. 28, 2011, pp. 93-102.

Sciacca,"Improving processors through better scheduling", http://ibmresearchnews.blogspot.in/2014/01/improving-processors-through-better.html?m=1, Jan. 2014, 3 pages.

Seo,"Energy Efficient Scheduling of Real-Time Tasks on Multicore Processors", In Proceedings of IEEE Transactions on Parallel and Distributed Systems, vol. 19, Issue 11, Nov. 2008, pp. 1540-1552.

"International Search Report and Written Opinion", Application No. PCT/US2017/058928, dated Feb. 19, 2018, 15 pages.

Miittal, Sparsh, "A Survey of Techniques for Improving Energy Efficiency in Embedded Computing Systems", In Proceedings of Computer Research Repository, Jan. 2014, 12 pages.

Kumar, et al., "Improved scheduler for multi-core many-core systems", In Journal of Computing, vol. 96, Issue 11, Nov. 2014, 3 pages.

* cited by examiner

THREAD IMPORTANCE BASED PROCESSOR CORE PARKING AND FREQUENCY SELECTION

RELATED APPLICATIONS

This application claims priority to U.S. Provisional Application No. 62/415,925, filed Nov. 1, 2016, entitled "Thread Importance Based Processor Core Parking And Frequency Selection", the disclosure of which is hereby incorporated by reference herein in its entirety.

BACKGROUND

As computing technology has advanced, computers have become increasingly commonplace in our lives. Many computing devices are designed to run on battery power, such as mobile phones, tablet computers, and so forth. Having such mobility with computing devices increases their usability, but is not without its problems. One such problem is that the wide variety of functionality provided by these computing devices consumes an unnecessary and significant amount of power. This leads to draining the battery, leaving the user unable to use the computing device until the computing device is recharged. This can lead to users being unable to use their devices in the manner they desire, and user frustration with their devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an importance level of a first thread scheduled to run on a processor core is determined. The importance level is one of multiple different importance levels. A frequency range associated with the importance level that is one of multiple different frequency ranges is determined, or an energy performance preference value associated with the importance level that is one of multiple energy performance preference values is determined. The processor core is configured to run at the frequency range or in accordance with the energy performance preference value while running the first thread.

In accordance with one or more aspects, for each of multiple threads run on a processor core over a given time duration, an importance level of the thread is determined, each importance level being one of multiple different importance levels. A utilization factor of the processor core is determined based at least in part on the importance levels of the threads run on the processor core over the given time duration. Based on the utilization factor of the processor core, a determination is made whether to park the processor core. The processor core is parked in response to determining to park the processor core based on the utilization factor of the processor core.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Thread importance based processor core parking and frequency selection is discussed herein. A computing device includes one or more processors, and each processor includes one or more processor cores (also referred to herein as simply cores). Various programs are run on the computing device as one or more processes, each process including one or more threads. Each processor core supports various different frequency ranges, also referred to as p-states, and can operate to run threads at any one of those different frequency ranges. The efficiency of a processor core varies at different frequency ranges, and is typically not linear. For example, the amount of work done by the processor increases approximately linearly with the frequency of the processor core, but the amount of power consumed to perform that amount of work can increase at a faster rate (e.g., exponentially).

Threads in a computing device are assigned one of multiple importance levels. There can be two importance levels (e.g., important and unimportant), or alternatively any number of importance levels. The importance level of a thread can be determined on various different factors, such as whether the thread belongs to the foreground process or its descendants, whether the thread owns a foreground or visible window, whether the thread is involved in audio playback, whether a thread is working on behalf of another high importance or high quality of service thread, and so forth. In one or more embodiments, a processor core is configured to run at a particular frequency range based on the importance level of the thread it is running. For example, threads having an importance level of unimportant can be executed in a frequency range that is most efficient (or within a threshold amount, such as 5%, of being most efficient) for the processor core. The most efficient frequency range for the processor core refers to the one or more frequencies having the maximum or highest performance per watt (units of power) for the processor core. However, threads having an importance level of important can be executed at a higher frequency range, resulting in the threads having an importance level of important being executed faster than threads having an importance level of unimportant, but also at a performance level that is less efficient (e.g., less work done per watt and thus higher energy usage per unit of work done) than the frequency range at which the threads having an importance level of unimportant are executed.

In one or more embodiments, the importance levels are referred to as quality of service levels. In such embodiments, the threads are assigned one of multiple quality of service levels (e.g., high quality of service and low quality of service) that indicate the quality of service the thread is to receive. The discussions herein regarding different importance levels apply analogously to different quality of service levels. A processor core is configured to run at a particular frequency range based on the quality of service level of the thread it is running. For example, threads assigned a low quality of service level can be executed in a frequency range that is most efficient (or within a threshold amount, such as 5%, of being most efficient) for the processor core. However, threads assigned a high quality of service level can be executed at a higher frequency range, resulting in the threads having a high quality of service being executed faster than threads having a low quality of service, but also at a performance level that is less efficient (e.g., less work done per watt and thus higher energy usage per unit of work done) than the frequency range at which the threads having a low quality of service are executed.

Additionally or alternatively, each group of processor cores is configured with a particular energy performance preference (EPP) value. The energy performance preference value indicates to the processor core to run in accordance with a particular energy performance preference preferring higher performance or lower energy usage when executing a thread. A processor core is configured to run in accordance with an energy performance preference based on the importance level of the thread it is running. For example, a processor core can be configured to run in accordance with an energy performance preference that indicates to prefer higher performance (and higher energy usage) to execute threads having an importance level of important, whereas a processor core can be configured to run in accordance with an energy performance preference that indicates to prefer lower energy usage to execute threads having an importance level of unimportant.

The utilization factor of a processor core can also be determined over some time duration (e.g., the preceding 100 milliseconds (ms)). The utilization factor is based on the amount of time during the time duration that the processor core was running a thread(s), and is based on the importance levels of the thread(s) run during the time duration. Threads of a certain importance level (e.g., the importance level of unimportant) can be excluded from the utilization factor or given less weight in determining the utilization factor than threads run at other importance levels. The utilization factor can then be used to determine whether to park the processor core, which refers to putting the processor core in a low power mode. For example, if the utilization factor for the processor core is less than a threshold amount (e.g., 3%) and there are no pending high importance level threads queued up/backed up in the ready queue, then the processor core can be parked for the next utilization duration/period.

Using the techniques discussed herein, power consumption of a computing device is reduced when threads having less than a particular importance level (e.g., threads with an importance level of unimportant) are run on the computing device. Threads having less than the particular importance level can be run at a frequency range that is slower than the processor core is capable of running threads (but is more efficient) and/or in accordance with an energy performance preference that prefers lower energy usage. Thus, threads having less than the particular importance level can still execute, but additional power is not expended to execute those threads at a faster rate. Additionally or alternatively, when a processor core is running threads having less than a particular importance level (e.g., threads with an importance level of unimportant), those threads can be removed from (or their influence reduced in) the determination of the utilization factor for the processor core. This allows the processor core to be parked to conserve energy based primarily (or solely) on threads having at least the particular importance level (e.g. threads with an importance level of important) rather than other less important threads.

Figure 1:
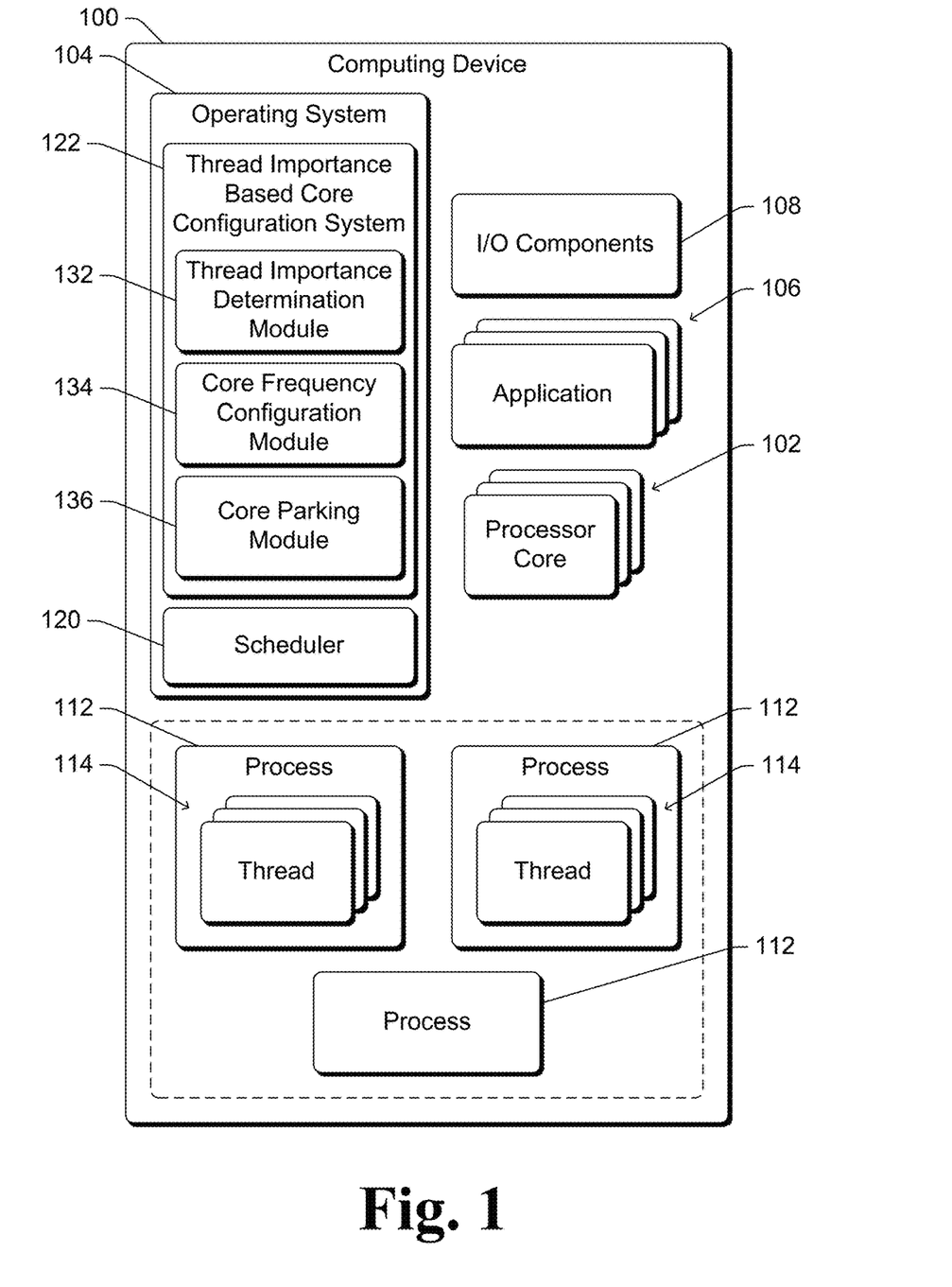
FIG. 1 is a block diagram illustrating an example computing device implementing the thread importance based processor core parking and frequency selection in accordance with one or more embodiments.

FIG. 1 is a block diagram illustrating an example computing device 100 implementing the thread importance based processor core parking and frequency selection in accordance with one or more embodiments. Computing device 100 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, virtual reality (VR) devices, augmented reality (AR) devices), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, computing device 100 may range from a full resource device with substantial memory and processor resources (e.g., personal computers, game consoles) to a low resource device with limited memory and/or processing resources (e.g., traditional set-top boxes, hand-held game consoles).

Computing device 100 includes one or more processor cores 102, an operating system 104, one or more applications 106, and one or more input/output (I/O) components 108. The processor cores 102 can be included as part of a single processor (e.g., a multi-core processor) chip and/or as part of separate processor chips.

The I/O components 108 include various components or modules configured to output data or instructions from the computing device 100 and/or receive data or instructions for the computing device 100. The I/O components, include for example, communication components (e.g., supported wireless and/or wired communication), user output components (e.g., display components), user input components (e.g., keyboards), and so forth.

The operating system 104 manages execution of the applications 106. The applications 106 can be any of a variety of different types of applications, such as productivity applications, gaming or recreational applications, utility applications, and so forth. The operating system 104 itself can also be made up of multiple programs and the operating system 104 manages execution of those modules or programs as well.

The applications 106 and the operating system 104 are executed as one or more processes 112 on the computing device 100. Each process 112 is an instantiation of an application 106 or a part of (e.g., a module of) the operating system 104. Each process 112 typically includes more threads 114. However, in some situations a process 112 does not include multiple threads 114, in which case the process can be treated as a single thread process.

The operating system 104 manages execution of the applications 106 by scheduling execution of the threads 114 of the applications 106. The operating system 104 also schedules execution of the threads 114 of programs of the operating system 104. Scheduling a thread for execution refers to informing a processor core 102 to execute the instructions of the thread.

Each processor core 102 operates to run threads 114 at a particular frequency range or within a particular frequency range. The processor core 102 has an associated maximum frequency at which it can run, but in one or more embodiments is also configurable to run at a particular frequency or within a particular frequency range specified by a program running on the computing device 100. In one or more embodiments, the processor core 102 has two registers that can be written to by a program running on the computing device 100 to set upper and lower frequencies specifying a frequency range within which the processor core 102 is to run. The processor core 102 proceeds to operate within that specified frequency range to execute threads. Additionally or alternatively, the processor 102 can have a single register that is written to by a program running on the computing device 100 to specify a frequency at which the processor core 102 is to run. The processor core 102 proceeds to operate at that specified frequency (or within a frequency range determined based on the specified frequency range, such as the specified frequency range plus or minus 5%).

Additionally or alternatively, each processor core 102 can be configured with an energy performance preference (EPP). The energy performance preference indicates to the processor whether to prefer high performance or lower energy usage when executing threads. For example, on an EPP scale from 0 to 100, an EPP value of 0 would mean "highest performance" and an EPP value of 100 would mean "lowest energy". The processor core 102 contains internal logic to modulate frequency itself based on utilization. Lower EPP values would make the processor core 102 more aggressive at increasing frequency in response to an increase in utilization of the processor core 102, and vice versa. Additionally or alternatively, internal processor core 102 logic can determine, for example, that the processor core 102 would not boost frequency above a certain point if the EPP is greater than some particular value. In one or more embodiments, the processor core 102 has a register that can be written to by a program running on the computing device 100 (e.g., a module of the operating system 104) to set the energy performance preference in accordance with which the processor core 102 is to run.

The operating system 104 includes a scheduler 120 and a thread importance based core configuration system 122. The scheduler 120 determines which threads 114 to schedule at which times for execution by which processor cores 102. The scheduler 120 can make these scheduling decisions in a variety of different manners based on various public and/or proprietary techniques, such as based on the priorities assigned to threads by the operating system 104, based on how much execution time each thread has already been scheduled for, and so forth.

The thread importance based core configuration system 122 determines the importance level of each thread 114 running on the computing device 100, and configures the processor cores 102 based on the determined importance levels. The thread importance based core configuration system 122 includes a thread importance determination module 132, a core frequency configuration module 134, and a core parking module 136. The thread importance determination module 132 determines the importance level of each thread 114 using various different rules or criteria, as discussed in more detail below. The core frequency configuration module 134 determines a frequency range for a processor core 102 based on the importance level of the thread 114 running on that processor core 102, and provides configuration information to that processor core 102 so that that processor core 102 runs at the determined frequency range. Additionally or alternatively, the core frequency configuration module 134 can determine the energy performance preference for a processor core 102 based on the importance level of the thread 114 running on that processor core 102, and provide configuration information to that processor core 102 so that the processor core 102 runs in accordance with the determined energy performance preference. The core parking module 136 determines whether to park a processor core 102 based on a utilization factor of the processor core 102, the utilization factor being based at least in part on the importance of threads 114 running on that processor core 102. Although illustrated as separate from the scheduler 120, one or more modules of the thread importance based core configuration system 122, such as the thread importance determination module, can be implemented as part of the scheduler 120.

It should be noted that in some situations the thread importance based core configuration system 122 does not include both the core frequency configuration module 134 and the core parking module 136. For example, the thread importance based core configuration system 122 may not support parking a processor core 102 based on a utilization factor that is based on the importance of threads 114 running on that processor core 102, in which case the core parking module 136 need not be included in the thread importance based core configuration system 122. By way of another example, the thread importance based core configuration system 122 may not support determining a frequency range for a processor core 102 based on the importance level of the thread running on that processor core 102, in which case the core frequency configuration module 134 need not be included in the thread importance based core configuration system 122.

Each processor core 102 can operate to execute threads 114 in different frequency ranges. Typically, executing threads at higher frequencies results in faster execution of the thread 114 than when executed at lower frequencies, but also more power consumption than when executed at lower frequencies. In one or more embodiments, the thread importance based core configuration system 122 is configured with or otherwise obtains an indication of various different frequency ranges associated with different importance levels for threads. In one or more embodiments, these associated frequency ranges are selected or determined so that threads of lower importance are executed at a frequency range that is more efficient (e.g., within a threshold amount of being the most efficient frequency range for the processor core 102 executing the thread) but slower than threads of higher importance. The thread importance based core configuration system takes advantage of the importance level of a thread to reduce power consumed by the processor core 102 in executing the thread, keeping in mind that unimportant work (e.g., done by threads having a lower importance level) is not urgent.

In one or more embodiments, the indications of the different frequency ranges associated with different importance levels for threads is provided to the thread importance based core configuration system 122. These indications can be preconfigured in the thread importance based core configuration system 122, can be maintained in a data store (e.g., a registry, database, etc.) accessible to the thread importance based core configuration system 122, and so forth. In such situations, the indications are pre-determined by another device or component, such as a manufacturer of the processor core 102, an original equipment manufacturer (OEM) of the computing device 100, and so forth.

Additionally or alternatively, the thread importance based core configuration system 122 determines the different frequency ranges associated with different importance levels for threads. The thread importance based core configuration system 122 can determine the different frequency ranges associated with different importance levels for threads in various different manners. In one or more embodiments, the thread importance based core configuration system 122 includes a module that runs workloads (e.g., sets of instructions) on the processor cores 102 to determine the various frequency ranges as follows.

Figure 2:
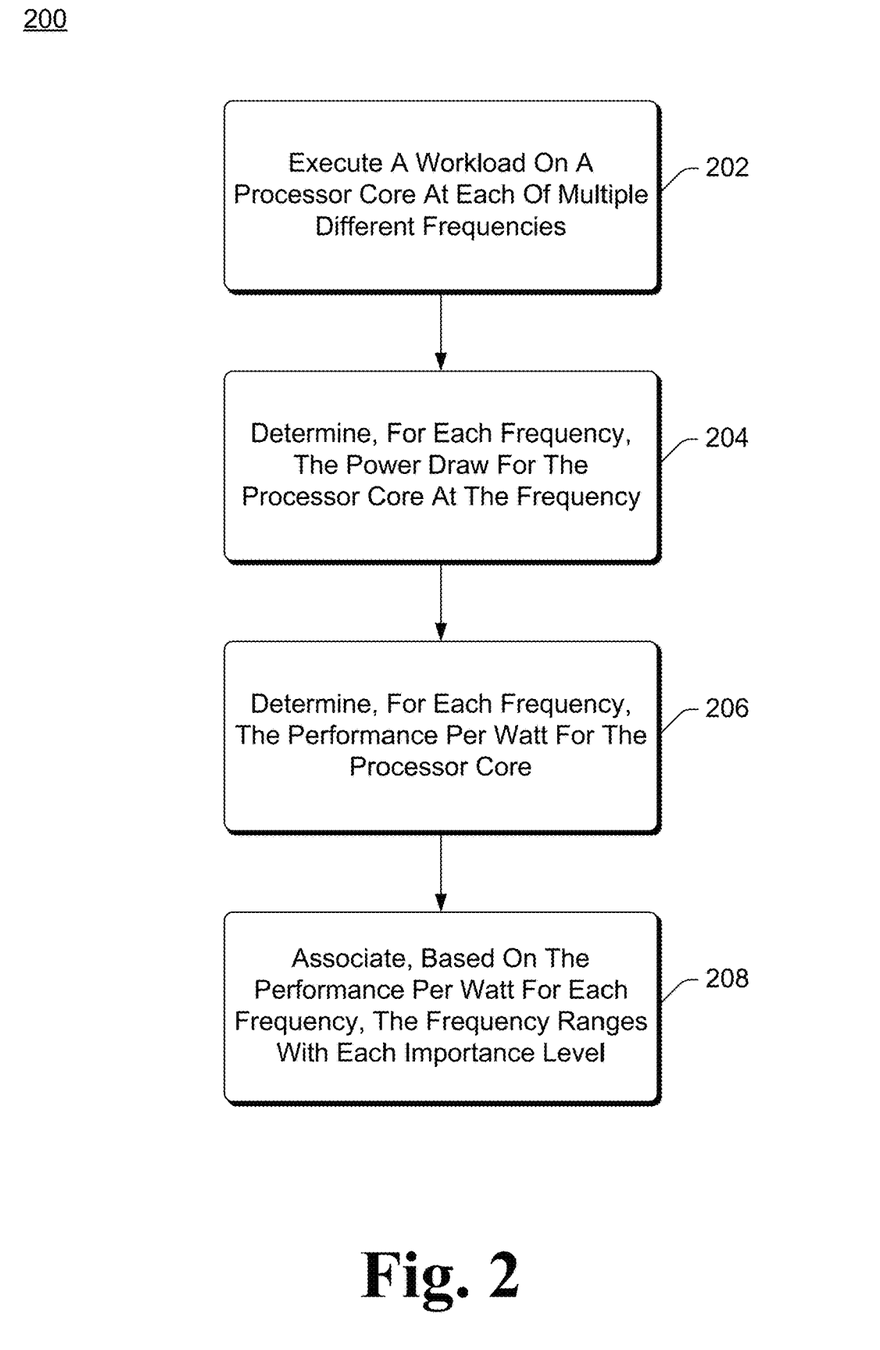
FIG. 2 is a flowchart illustrating an example process for determining the different frequency ranges associated with different importance levels for threads in accordance with one or more embodiments.

FIG. 2 is a flowchart illustrating an example process 200 for determining the different frequency ranges associated with different importance levels for threads in accordance with one or more embodiments. Process 200 is carried out by a computing device, such as computing device 100 of FIG. 1, and can be implemented in software, firmware, hardware, or combinations thereof. Process 200 is shown as a set of acts and is not limited to the order shown for performing the operations of the various acts. Process 200 is an example process for implementing the determining the different frequency ranges associated with different importance levels for threads; additional discussions of implementing the determining the different frequency ranges associated with different importance levels for threads are included herein with reference to different figures.

In process 200, a workload is executed on a processor core at each of multiple different frequencies (act 202). The workload is a set of instructions. The frequency at which the processor core runs can be specified by a program running on the computing device 102, such as by setting one or more registers of the processor core as discussed above. The workload is executed on the processor core at each of multiple different frequencies, such as by starting at a lower frequency (e.g., 500 Megahertz (MHz)) and incrementing the frequency by 100 MHz until an upper frequency (e.g., a top rated frequency of the processor core, such as 2.9 Gigahertz (GHz)). Thus, for example, the workload is executed at 500 MHz, then at 600 MHz, then at 700 MHz, and so forth.

For each frequency at which the workload is executed, the power draw for the processor core at that frequency is determined (act 204). The power draw for the processor core at that frequency can be determined in a variety of different manners. In one or more embodiments, the processor core includes a register in which the processor core records how much energy (e.g., how many joules) is being consumed by the processor core at any given time. This register is read by a program running on the computing device 102, and the average power draw at the frequency at which the processor core is running can be readily determined by dividing the amount of energy being consumed by the processor core while running at that frequency by the amount of time the processor core was running at that frequency.

For each of the multiple different frequencies in act 202 at which the workload was executed, the performance per watt for the processor core is determined (act 206). The performance per watt can be readily generated by dividing, for each of the multiple different frequencies, dividing the frequency by the power draw determined at that frequency. Although the performance per watt is discussed herein, it should be noted that units of power other than the watt can alternatively be used.

Based on the performance per watt for each of the multiple frequencies, the frequency ranges are associated with each importance level (act 208). Various different rules or criteria can be applied to associate the importance levels with frequency ranges. In one or more embodiments, two importance levels are used: important and unimportant. Given the performance per watt for each of the multiple different frequencies, one or more frequencies that give a maximum or highest performance per watt can be readily identified. The frequency range for the unimportant importance level includes the one or more frequencies having the maximum or highest performance per watt (or one or more frequencies within a threshold amount of the one or more frequencies that give a maximum or highest performance per watt, such as 5%). The frequency range for the unimportant importance level can also include additional frequencies, such as frequencies having a performance per watt that is within a threshold amount (e.g. 5%) of the maximum or highest performance per watt. Continuing with this example, the frequency range for the important importance level ranges from the upper end of the frequency range for the unimportant importance level to another value that satisfies a performance threshold. This performance threshold can be determined in various manners, such as a frequency having a performance per watt that is a threshold amount (e.g., 10%) below the maximum or highest performance per watt.

The process 200 can be performed for each processor core 102 in the computing device 100. Alternatively, if two processor cores 102 are the same (e.g., operate at the same speeds, have the same architecture, etc.), then the frequency ranges associated with each importance level determined in act 208 for one of the processor cores 102 can be used for other processor cores 102 that are the same.

Figure 3:
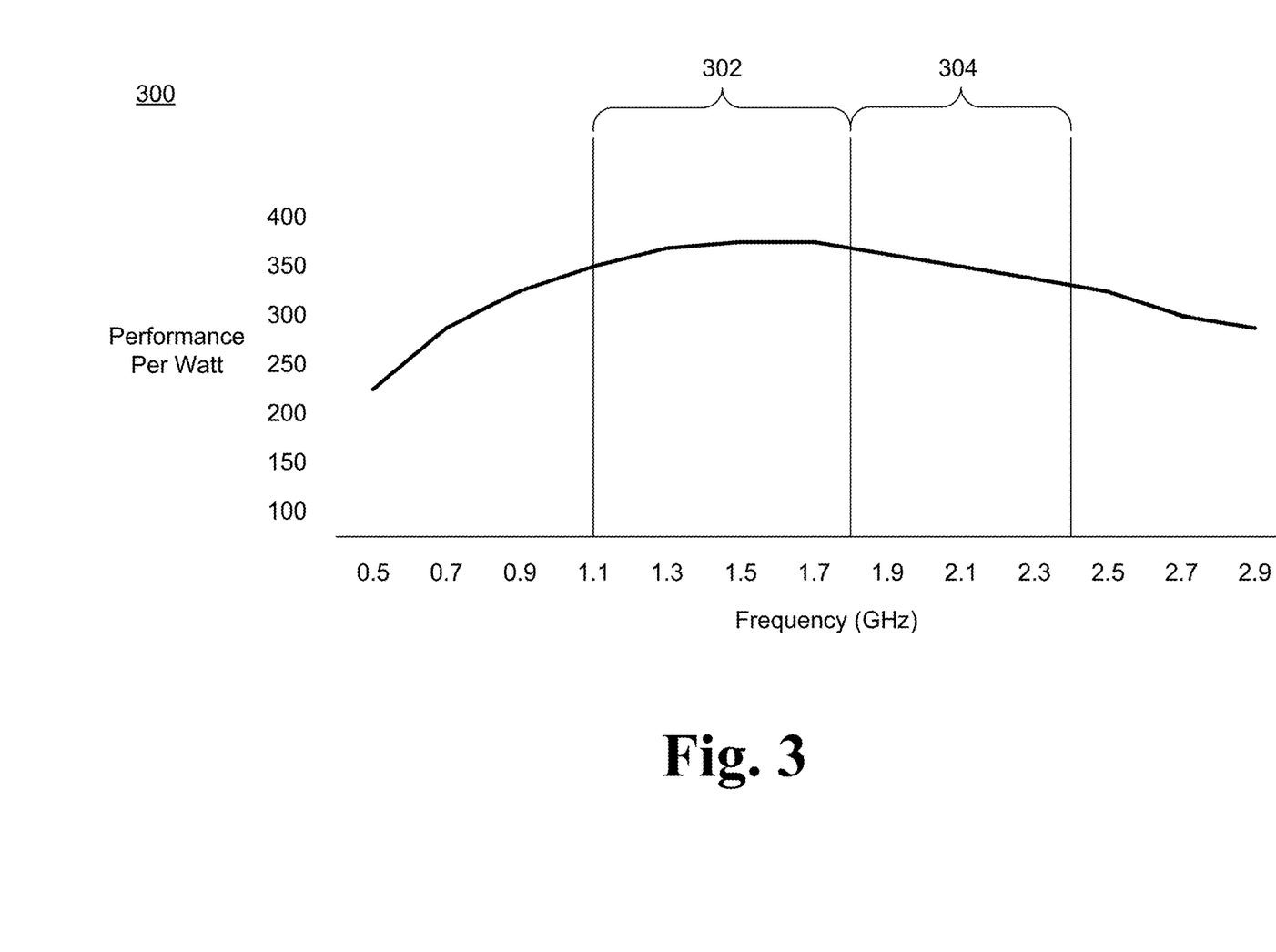
FIG. 3 illustrates an example graph of performance of a processor core in accordance with one or more embodiments.

FIG. 3 illustrates an example graph 300 of performance of a processor core in accordance with one or more embodiments. On the horizontal (X) axis is processor core frequency in GHz, and on the vertical (Y) axis is performance per watt. A frequency range 302, ranging from 1.1 GHz to 1.8 GHz, is associated with the important importance level. A frequency range 304, ranging from 1.8 GHz to 2.4 GHz, is associated with the unimportant importance level.

Returning to FIG. 1, the thread importance determination module 132 determines the importance level of each thread 114. Various different rules or criteria can be used to determine the importance level of a thread 114. In one or more embodiments, two importance levels are used: important and unimportant. By default a thread 114 is determined to have the unimportant importance level unless one or more criteria indicate that the thread 114 is to have the important importance level. Various different criteria are discussed herein. It should be noted that these criteria are examples, and that not all these criteria need be used and/or additional criteria can be used.

One criteria used to determine whether the thread 114 is to have the important importance level is whether the thread 114 belongs to the foreground process or its descendants. A foreground process refers to the foremost or foreground process running on the computing device 100. The descendants of the foreground process are processes spawned by the foreground process. If the thread 114 belongs to the foreground process or the descendants of the foreground process, then the thread 114 is determined to have the important importance level.

Another criteria used to determine whether the thread 114 is to have the important importance level is whether the thread 114 owns a foreground or visible window. A foreground or visible window refers to a window that is being displayed by the computing device 109 and is visible (e.g., seen by a user looking at the display of the computing device 100). If the thread 114 owns a foreground or visible window, then the thread 114 is determined to have the important importance level.

Another criteria used to determine whether the thread 114 is to have the important importance level is whether the thread is working on behalf (e.g., via cross-thread/process communication mechanism) of another thread having the important importance level. Which threads are working on behalf of another thread is indicated in the data associated with the threads (e.g., thread metadata maintained by the operating system 104). The chain of threads working on behalf of other threads can be followed by the thread importance based core configuration system 122 to determine whether a thread is working on behalf of another thread having the important importance level. If the thread 114 is working on behalf of another thread having the important importance level, then the thread 114 is determined to have the important importance level.

Another criteria used to determine whether the thread 114 is to have the important importance level is whether the thread 114 has high CPU (processor) priority. A thread 114 typically has a normal priority, but can be increased to a high priority thread by the operating system 104 for any of a variety of different reasons, such as the thread 114 is waiting for I/O, the thread 114 belongs to a foreground process, the thread 114 is contending a lock, and so forth. If the thread 114 has high CPU priority, then the thread 114 is determined to have the important importance level.

Another criteria used to determine whether the thread 114 is to have the important importance level is whether the thread 114 is a system thread. A system thread refers to a thread belonging to a process of the operating system 104. Threads belonging to all processes of the operating system 104 can be system threads, or alternatively only some threads (e.g., kernel mode threads or threads otherwise designated by the operating system 104) can be system threads. If the thread 114 is a system thread, then the thread 114 is determined to have the important importance level.

Another criteria used to determine whether the thread 114 is to have the important importance level is whether the thread 114 is involved in audio playback. A thread 114 is involved in audio playback if the thread belongs to a process that plays back audio data (e.g., a process that is an instantiation of a music player program). If the thread 114 is involved in audio playback, then the thread 114 is determined to have the important importance level.

Another criteria used to determine whether the thread 114 is to have the important importance level is whether the thread 114 is involved in displaying graphics. A thread 114 is involved in displaying graphics if the thread belongs to a process that generates video data (e.g., a process that is an instantiation of a movie player program) or otherwise processes video data. If the thread 114 is involved in displaying graphics, then the thread 114 is determined to have the important importance level.

Another criteria used to determine whether the thread 114 is to have the important importance level is whether the thread 114 has explicitly requested to have the important importance level. A thread 114 may request to have the important importance level for any of a variety of different reasons, such as the thread 114 does not want to be throttled.

If the thread 114 has explicitly requested to have the important importance level, then the thread 114 is determined to have the important importance level.

Another criteria used to determine whether the thread 114 is to have the important importance level is whether the thread 114 belongs to applications that are known to be in the background. An application in the background refers to, for example, an application that is minimized or otherwise not visible on a display of the computing device 102 (e.g., not visible to a user of the computing device 102 looking at a display of the computing device 102). If the thread 114 belongs to an application that is known to be in the background, then the thread 114 is determined to have the unimportant importance level.

Although examples are included herein for two different importance levels, it should be noted that the thread importance based core configuration system 122 can support any number of different importance levels. Various different rules or criteria are used to determine which of the multiple different importance level a thread 114 has.

For example, the thread importance based core configuration system 122 can support three importance levels: unimportant, important, and super-important. One or more of the criteria discussed above can be used to determine whether a thread 114 has an important importance level or an unimportant importance level. Additional criteria can be used to determine whether a thread 114 has a super-important importance level, such as whether the thread 114 is within a threshold amount of time of missing a deadline. Various threads 114 can have different deadlines for when they must be run, such as when playing back of audio data or video data. If a thread 114 is within a threshold amount of time (e.g., 5 milliseconds) of missing a deadline, then the thread 114 is determined to have the super-important importance level.

The core frequency configuration module 134 determines a frequency range for a processor core 102 based on the importance level of the thread 114 running on that processor core 102, and provides configuration information to that processor core 102 so that that processor core 102 runs at the determined frequency range. For a given thread 114, the core frequency configuration module 134 accesses the frequency ranges associated with the importance level of the thread 114 as discussed above, and provides configuration information to the processor core 102 running that thread to run at the frequency range associated with the importance level of the thread 114.

The core frequency configuration module 134 can provide the configuration information to the processor core 102 in a variety of different manners. In one or more embodiments, the processor core 102 includes one or more registers that the core frequency configuration module 134 can write a frequency or the frequency range to as discussed above. At the time of a context switch for the processor core 102 in which the processor core 102 is to begin executing a particular thread 114, the core frequency configuration module 134 writes the values indicating a frequency or frequency range to the appropriate registers of the processor core 102. The processor core 102 then proceeds to run the thread 114 at that specified frequency or frequency range. It should be noted that a frequency range as discussed herein can be a wide range (e.g., spanning 500 MHz or more), or a narrow range (e.g., spanning 50 MHz). The core frequency configuration module 134 can also specify a single frequency that is the frequency range associated with the importance level of the thread, and realize that the processor core 102 may run at a range of frequencies that is approximately equal to (e.g., within a threshold amount, such as 3%) of the specified frequency.

Alternatively, rather than the core frequency configuration module 134 writing to registers of the processor core 102, an indication of the frequency range associated with the importance level of the thread 114 can be provided to the processor core 102 as part of context information included as part of the context switch. During a context switch, various information can be provided to the processor core 102 as part of the context switch, including various processor state such as register values. The registers that indicate the frequency range at which the processor core 102 is to run can be included as part of this processor state and saved when the thread 114 is switched out (so another thread can be run by the processor core 102), and then written back to the processor core 102 when the context is switched back to the thread 114. Maintaining the frequency range as part of the context information improves performance of the computing device 100 by alleviating the need for a separate write to the registers of the processor core 102 by the core frequency configuration module 134 to specify the frequency range associated with the importance level of the thread.

In one or more embodiments, this context information is saved as part of an XSAVE (Save Processor Extended States) instruction when the thread 114 is switched out (so another thread can be run by the processor core 102). In one or more embodiments, the information saved as part of the XSAVE instruction is the values of the registers of the processor core 102 that specify the frequency range at which the processor core 102 is to run for the thread 114.

Additionally or alternatively, the context information can include an indication of the importance level of the thread by specifying the importance level of the thread (e.g., including a data value of "important" or "unimportant"). The processor core 102 is then able to leverage this information to make various different power conservation decisions when executing the thread 114. For example, the processor core 102 may be preconfigured with the frequency range for each importance level, and thus need not be informed of such frequency ranges by the thread importance based core configuration system 122. By way of another example, the processor core 102 may employ additional power conservation techniques for threads that the processor core 102 knows are unimportant, and can apply those additional power conservation techniques to threads having the unimportant importance level.

By communicating thread importance to the processor core (e.g., using the XSAVE instruction), processor cores 102 can autonomously make better p-state modulation decisions. This alleviates the operating system 104 from adjusting the processor core's power management state manually on each context switch, which may be less efficient than providing thread importance information to the processor core and allowing it to adjust its power management parameters.

It should be noted that the priority of a thread can influence the importance level of a thread as discussed above, but that the priority of a thread is different from the importance level of a thread. The scheduler 120 uses the priorities of threads to determine which threads get executed in which order (e.g., higher priority threads are executed before lower priority threads). The scheduler 120 uses the importance levels of threads to determine frequency ranges for processor cores 102 that will execute the threads.

The core parking module 136 determines whether to park a processor core 102 based on a utilization factor of the processor core 102, the utilization factor being based at least in part on the importance of threads 114 running on that processor core 102. Parking a processor 102 refers to putting the processor core 102 into a low power mode in which the processor core 102 does not execute instructions. The core parking module 136 can determine whether to park a processor core 102 at various different times, such as at regular or irregular intervals, in response to other events in the computing device 100 (e.g., execution of a new process), and so forth.

The core parking module 136 determines a utilization factor for processor core 102. The utilization factor for a processor core 102 refers to how much the processor core is being utilized to run threads, and the utilization factor accounts for the importance levels of threads that are executed by excluded from the utilization factor (or giving less weight to in determining the utilization factor) threads having a lower importance level.

The core parking module 136 determines the utilization factor of a processor core 102 over some time duration (e.g., the preceding 100 milliseconds (ms)). In one or more embodiments, the core parking module 136 ignores (excludes from consideration) any threads that were run by the processor core 102 that have less than a threshold importance level (e.g., any threads run by the processor core 102 having an unimportant importance level). For example, if over the preceding 100 ms the processor core ran thread(s) having an important importance level for 50 ms, and thread(s) having an unimportant importance level for 30 ms, then the core parking module 136 ignores the threads having an unimportant importance level (excludes those threads from consideration in determining the utilization factor) and determines that the utilization factor of the processor core is 50%.

Alternatively, the core parking module 136 gives less weight to or reduces the influence of any threads that were run by the processor core 102 that have less than a threshold importance level (e.g., any threads run by the processor core 102 having an unimportant importance level). This reduced weighting or influencing can be implemented in various manners, such as by factoring in the amount of time by less than the full amount of time that those threads having less than the threshold importance level were run. For example, if over the preceding 100 ms the processor core ran thread(s) having an important importance level for 50 ms, and thread(s) having an unimportant importance level for 30 ms, then the core parking module 136 can reduce the influence of the threads having an unimportant importance level by reducing the amount of time 90%. E.g., the core parking module 136 can determine that the utilization factor of the processor core is 50 ms (due to the threads having an important importance level) plus 3 ms (due to the 30 ms of the threads having an unimportant importance level reduced by 90%), resulting in a utilization factor for the processor core of 53%.

In situations in which the thread importance based core configuration system 122 supports three or more importance levels, the core parking module 136 can determine the utilization factor in a variety of different manners. In one or more embodiments, the core parking module 136 ignores any threads that were run by the processor core 102 that have less than a threshold importance level. For example, if the importance levels are low, medium, and high, then the core parking module 136 can ignore the threads having the low importance level, or ignore the threads having either a low importance level or a medium importance level.

Additionally or alternatively, the core parking module 136 gives different weights or influences to the threads having different importance levels. For example, if the importance levels are low, medium, and high, then the core parking module 136 can reduce the influence of the threads having a low importance level by reducing the amount of time 90%, and reduce the influence of the threads having a medium importance level by reducing the amount of time 50%. So, for example assume that over the preceding 100 ms the processor core ran thread(s) having a high importance level for 50 ms, and thread(s) having a medium importance level for 30 ms, and thread(s) having a low importance level for 20 ms. The core parking module 136 can determine that the utilization factor of the processor core is 50 ms (due to the threads having a high importance level) plus 15 ms (due to the 30 ms of the threads having a medium importance level reduced by 50%) plus 2 ms (due to the 20 ms of the threads having a low importance level reduced by 90%), resulting in a utilization factor for the processor core of 67%.

The core parking module 136 uses the utilization factor of each processor core 102 to determine whether to park the processor core 102. The utilization factor can be used in a variety of different manners. In one or more embodiments, if the utilization factor satisfies a threshold value (the utilization factor is below 10%), then the core parking module 136 parks the processor core 102.

Similarly, the core parking module 136 uses the utilization factors of the processor cores 102 to determine whether to unpark a parked processor core 102. Unparking a processor core refers to exiting the processor core 102 from the low power mode, allowing threads to again be executed on the processor core 102. The utilization factor can be used in a variety of different manners to determine whether to unpark a processor core 102. In one or more embodiments, if a processor core 102 is parked then the utilization factors of at least one other unparked processor core 102 is used to determine whether to unpark the parked processor core 102. For example, if the utilization factor of other processors cores 102 (or alternatively of at least one other processor core 102) that are not parked does not satisfy a threshold value (the utilization factor is below 60%), then the core parking module 136 keeps the parked processor core 102 parked. However, if the utilization factor of other processors cores 102 (or alternatively of at least one other processor core 102) that are not parked satisfies a threshold value (the utilization factor is equal to or above 60%), then the core parking module 136 unpark the parked processor core 102.

The core parking module 136 thus reduces or eliminates the contribution that threads having less than a threshold importance level (e.g., any threads run by the processor core having an unimportant importance level) have to the utilization factor. The utilization of a processor core by threads having less than the threshold importance level thus has little or no effect on determining whether to park the processor core, preventing threads having less than the threshold importance level (e.g., unimportant threads) from preventing parking of a processor core.

Figure 4:
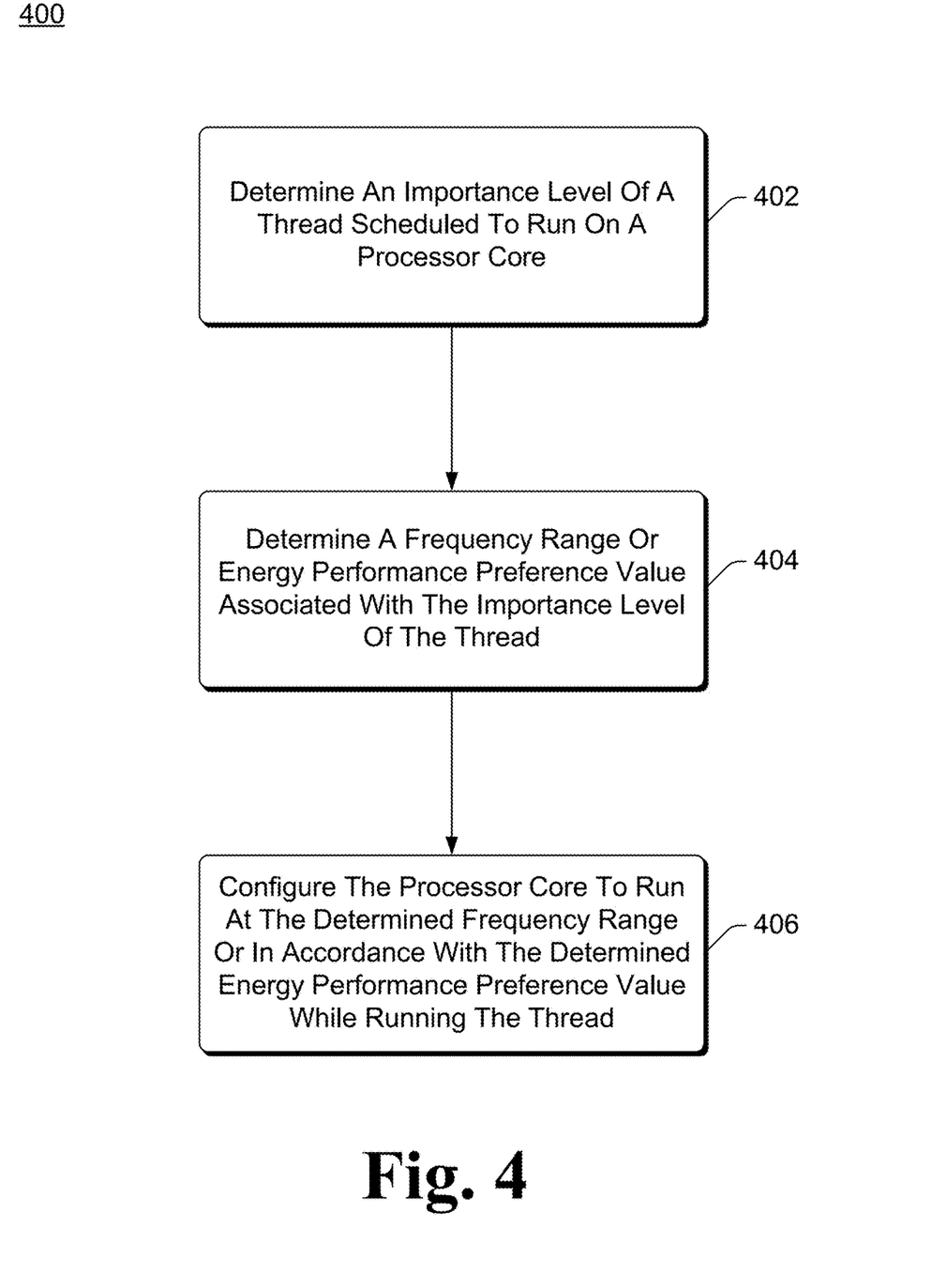
FIG. 4 is a flowchart illustrating an example process for implementing the techniques discussed herein in accordance with one or more embodiments.

FIG. 4 is a flowchart illustrating an example process 400 for implementing the techniques discussed herein in accordance with one or more embodiments. Process 400 is carried out by a computing device, such as computing device 100 of FIG. 1, and can be implemented in software, firmware, hardware, or combinations thereof. Process 400 is shown as a set of acts and is not limited to the order shown for performing the operations of the various acts. Process 400 is an example process for implementing the techniques discussed herein; additional discussions of implementing the techniques discussed herein are included herein with reference to different figures.

In process 400, an importance level of a thread scheduled to run on a processor core is determined (act 402). The importance level is one of multiple different importance levels (e.g., important and unimportant), and can be determined in a variety of different manners as discussed above.

A frequency range or energy performance preference value associated with the importance level of the thread is determined (act 404). Various different frequency ranges can be associated with different importance levels as discussed above. For example, if the thread has an importance level of unimportant, then the thread can be executed in a frequency range that is most efficient (e.g., includes one or more frequencies having the maximum or highest performance per watt (or one or more frequencies within a threshold amount of the one or more frequencies that give a maximum or highest performance per watt, such as 5%)) for the processor core. Additionally or alternatively, various different energy performance preference values can be associated with different importance levels, as discussed above.

The processor core is configured to run at the frequency range determined in act 404 or in accordance with the energy performance preference value determined in act 404 while running the thread (act 406). The processor core can be configured in various different manners as discussed above, such as by writing values indicating the lower and upper frequencies of the frequency range to registers of the processor core, providing an indication of the frequency range in context information for the processor core, providing an indication of the energy performance preference value to the processor core, and so forth.

Figure 5:
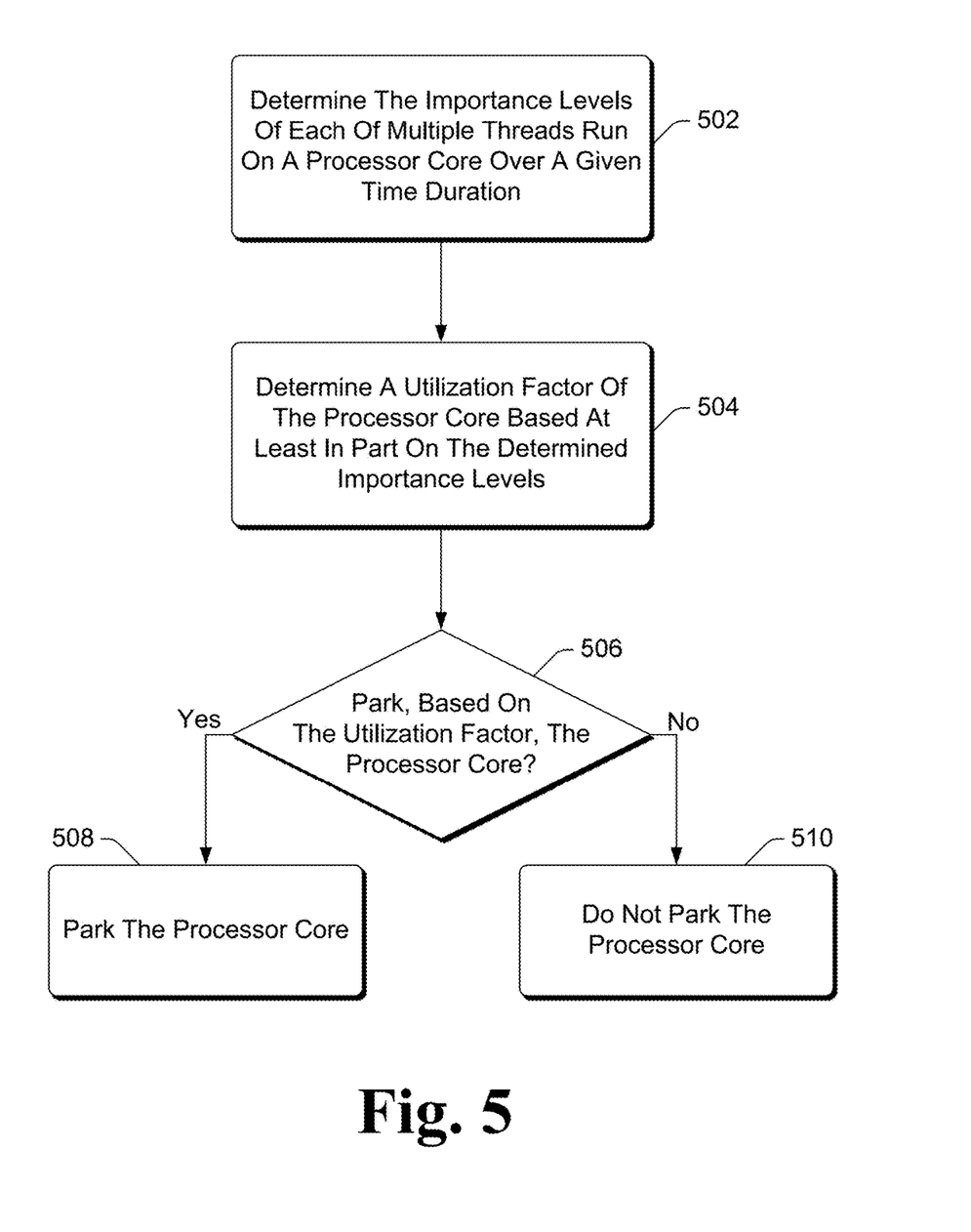
FIG. 5 is a flowchart illustrating another example process for implementing the techniques discussed herein in accordance with one or more embodiments.

FIG. 5 is a flowchart illustrating an example process 500 for implementing the techniques discussed herein in accordance with one or more embodiments. Process 500 is carried out by a computing device, such as computing device 100 of FIG. 1, and can be implemented in software, firmware, hardware, or combinations thereof. Process 500 is shown as a set of acts and is not limited to the order shown for performing the operations of the various acts. Process 500 is an example process for implementing the techniques discussed herein; additional discussions of implementing the techniques discussed herein are included herein with reference to different figures.

In process 500, the importance levels of each of multiple threads run on a processor core over a given time duration is determined (act 502). The importance levels are each one of multiple different importance levels (e.g., important and unimportant), and can be determined in a variety of different manners as discussed above. Various different time durations can be used, such as 100 ms.

A utilization factor of the processor core based at least in part on the determined importance levels is determined (act 504). The utilization factor reflects the amount of time that the processor core is being used to run threads over the given time duration. The utilization factor can be determined so as to ignore the amount of time, or reduce the influence the influence on the utilization factor of the amount of time, spent running certain threads (e.g., threads having less than a threshold importance level, such as unimportant threads).

A determination is made, based on the utilization factor, as to whether to park the processor core (act 506). This determination can be made in various manners, such as comparing the utilization factor to a threshold value (e.g., 10% utilization). If the determination is made to park the processor core, then the processor core is parked (act 508). However, if the determination is made not to park the processor core, then the processor core is not parked (act 510).

The techniques discussed herein thus allow decisions to be made (e.g., by the operating system) regarding configuration of processor cores, such as selecting the frequency range at which the processor cores run for particular threads and when to park processor cores, on the importance level of the threads running on the processor cores. Thus, an intelligent power conservation system can be implemented that allows threads deemed to be of high importance to run quickly, and that runs threads deemed to be of less importance (e.g., because their work does not directly impact user experience and as such may not be urgent) with greater power savings (e.g., a highest or close to a highest efficiency for the processor core).

Figure 6:
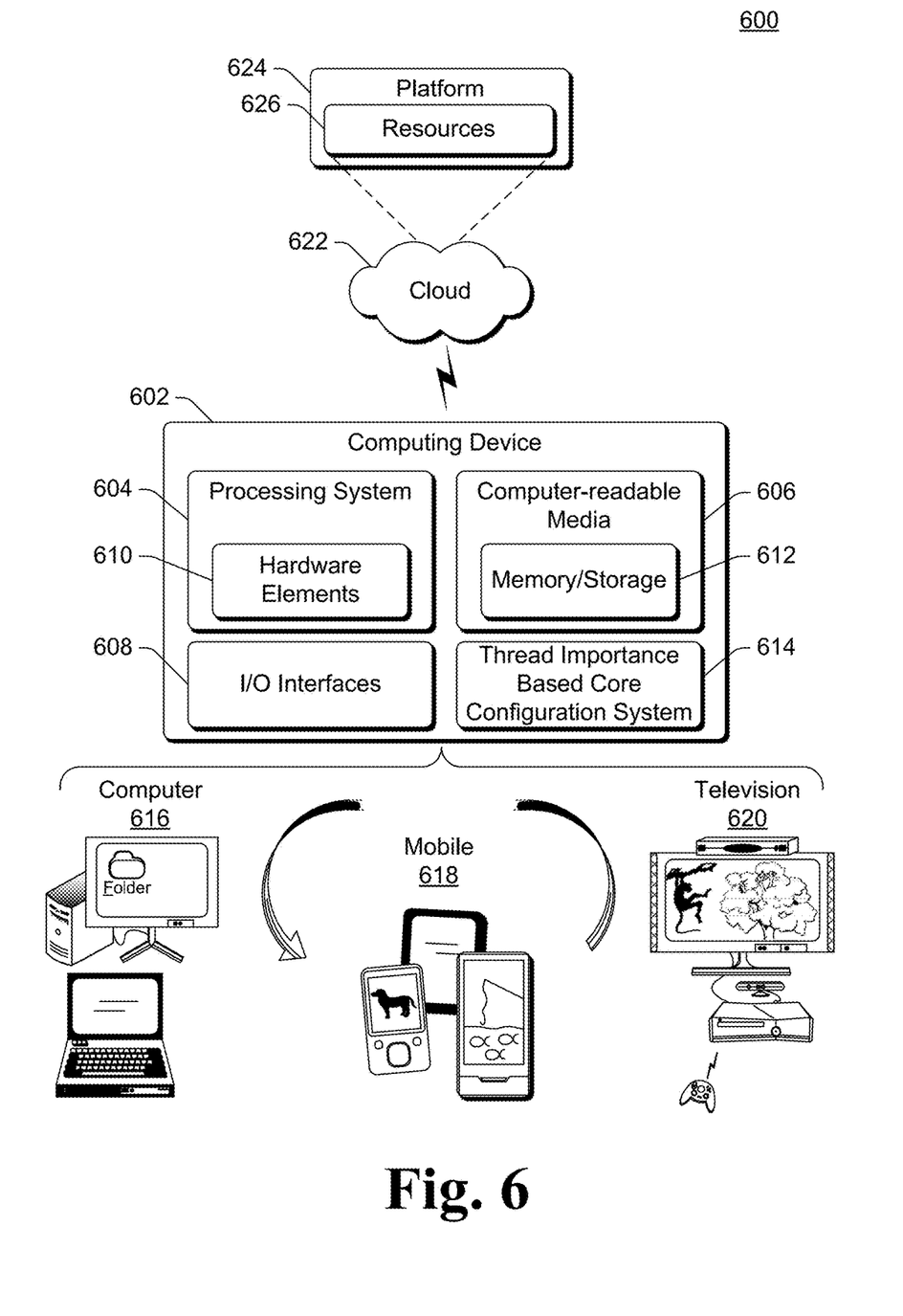
FIG. 6 illustrates an example system that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Resistive RAM (ReRAM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

The one or more input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

The computing device 602 also includes a thread importance based core configuration system 614. The thread importance based core configuration system 614 provides various functionality to select processor core frequencies and perform processor core parking as discussed above. The thread importance based core configuration system 614 is typically implemented as part of an operating system of the computing device 602, although alternatively can be implemented separately from the operating system. The thread importance based core configuration system 614 can implement, for example, the thread importance based core configuration system 122 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, and television 620 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on.

The computing device 602 may also be implemented as the mobile 618 class of device that includes mobile devices, such as a mobile phone, portable music player, portable gaming device, a tablet computer, a multi-screen computer, and so on. The computing device 602 may also be implemented as the television 620 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 622 via a platform 624 as described below.

The cloud 622 includes and/or is representative of a platform 624 for resources 626. The platform 624 abstracts underlying functionality of hardware (e.g., servers) and software resources of the cloud 622. The resources 626 may include applications and/or data that can be utilized while computer processing is executed on servers that are remote from the computing device 602. Resources 626 can also include services provided over the Internet and/or through a subscriber network, such as a cellular or Wi-Fi network.

The platform 624 may abstract resources and functions to connect the computing device 602 with other computing devices. The platform 624 may also serve to abstract scaling of resources to provide a corresponding level of scale to encountered demand for the resources 626 that are implemented via the platform 624. Accordingly, in an interconnected device embodiment, implementation of functionality described herein may be distributed throughout the system 600. For example, the functionality may be implemented in part on the computing device 602 as well as via the platform 624 that abstracts the functionality of the cloud 622.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: determining an importance level of a first thread scheduled to run on a processor core, the importance level being one of multiple different importance levels; determining a frequency range associated with the importance level that is one of multiple different frequency ranges or an energy performance preference value associated with the importance level that is one of multiple energy performance preference values; and configuring the processor core to run at the frequency range or in accordance with the energy performance preference value while running the first thread.

Alternatively or in addition to any of the above described methods, any one or combination of: the determining a frequency range or an energy performance preference value comprising determining the frequency range, each frequency range having been determined based on efficiency of the processor core at each of multiple different frequencies at which the processor core can run; the multiple different importance levels including an important level and an unimportant level, the importance level of the first thread comprising the unimportant level, and the frequency range associated with the unimportant level comprising a frequency range including one or more frequencies within a threshold amount of a most efficient frequency of the processor core; the method further comprising programmatically determining the efficiency of the processor core at each of multiple different frequencies at which the processor core can run, and identifying, based on the determined efficiencies, the frequency range associated with each of the multiple different importance levels; the multiple different importance levels comprising two or more quality of service levels; the configuring the processor core comprising writing an indication of the frequency range to one or more registers of the processor core; the configuring the processor core comprising including an indication of the importance level in context information provided to the processor core when the processor core switches contexts to being running the first thread; the determining a frequency range or an energy performance preference value comprising determining the energy performance preference value, the energy performance preference value indicating to the processor core whether to prefer high performance or lower energy usage while running the first thread; the method further comprising determining a utilization factor of the processor core based at least in part on the importance levels of threads run on the processor core over a given time duration, and determining, based on the utilization factor of the processor core, whether to park the processor core.

A method comprising: determining, for each of multiple threads run on a processor core over a given time duration, an importance level of the thread, each importance level being one of multiple different importance levels; determining a utilization factor of the processor core based at least in part on the importance levels of the threads run on the processor core over the given time duration; determining, based on the utilization factor of the processor core, whether to park the processor core; and parking the processor core in response to determining to park the processor core based on the utilization factor of the processor core.

Alternatively or in addition to any of the above described methods, any one or combination of: the determining the utilization factor comprising excluding from consideration in determining the utilization factor one or more of the multiple threads having less than a threshold importance level; the determining the utilization factor comprising weighting, for each of the threads run on the processor core over the given time duration, the thread based on the importance level of the thread; the method further comprising determining, based on utilization factors or one or more additional processor cores, to unpark the parked processor core, and unparking the parked processor core.

A computing device comprising: one or more processor cores; a thread importance determination module configured to determine an importance level of a first thread scheduled to run on a processor core of the one or more processor cores, the importance level being one of multiple different importance levels; and a core frequency configuration module configured to determine a frequency range associated with the importance level that is one of multiple different frequency ranges or an energy performance preference value associated with the importance level that is one of multiple energy performance preference values, and to configure the processor core to run at the frequency range or in accordance with the energy performance preference value while running the first thread.

Alternatively or in addition to any of the above described computing devices, any one or combination of: the core frequency configuration module being further configured to determine the frequency range, each frequency range having been determined based on efficiency of the processor core at each of multiple different frequencies at which the processor core can run; the multiple different importance levels including an important level and an unimportant level, the importance level of the first thread comprising the unimportant level, and the frequency range associated with the unimportant level comprising a frequency range including one or more frequencies within a threshold amount of a most efficient frequency of the processor core; the core frequency configuration module being further configured to determine the energy performance preference value, the energy performance preference value indicating to the processor core whether to prefer high performance or lower energy usage while running the first thread; the computing device further comprising a core parking module configured to determine a utilization factor of the processor core based at least in part on the importance levels of multiple threads run on the processor core over a given time duration, and to determine, based on the utilization factor of the processor core, whether to park the processor core; the core parking module being further configured to determine the utilization factor by excluding from consideration in determining the utilization factor one or more of the multiple threads having less than a threshold importance level; the determining the utilization factor comprising weighting, for each of the threads run on the processor core over the given time duration, the thread based on the importance level of the thread.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method comprising:
   executing a workload of a processor core at each of respective different frequencies among frequencies at which the processor core can run;
   programmatically determining, based on the executing, efficiencies of the processor core at each of the respective different frequencies, each efficiency corresponding to a respective ratio between frequency and power consumption;
   determining frequency ranges based on the determined efficiencies, and associating the frequency ranges with importance levels, respectively, wherein each frequency range comprises corresponding upper and lower frequencies within which the processor core is allowed to run to execute a thread;

determining an importance level of a first thread scheduled to run on the processor core, the importance level being one of the importance levels;

selecting, from among the determined frequency ranges, a frequency range associated with the determined importance level;

configuring the processor core to run at the selected frequency range while running the first thread; and wherein the importance levels include a first importance level and a second importance level that is lower than the first importance level, and wherein determining the frequency ranges based on the determined efficiencies is such that operation of the processor core in a frequency range associated with the second importance level is more efficient than operation of the processor core in a frequency range associated with the first importance level.

2. The method as recited in claim 1, each frequency range having been determined based on efficiency of the processor core at each of multiple different frequencies at which the processor core can run.

3. The method as recited in claim 1, the importance levels respectively comprising two or more quality of service levels.

4. The method as recited in claim 1, the configuring the processor core comprising writing an indication of the selected frequency range to one or more registers of the processor core.

5. The method as recited in claim 1, the configuring the processor core further comprising including an indication of the importance level in context information provided to the processor core when the processor core switches contexts to run the first thread.

6. The method as recited in claim 1, the selecting a frequency range further comprising determining an energy performance preference value, the energy performance preference value indicating to the processor core whether to prefer high performance or lower energy usage while running the first thread.

7. The method as recited in claim 1, further comprising:
determining a utilization factor of the processor core based at least in part on the importance levels of threads run on the processor core over a given time duration; and
determining, based on the utilization factor of the processor core, whether to park the processor core.

8. A computing device comprising:
a processor core;
storage hardware storing associations of different frequency ranges with different importance levels for threads, where the different frequency ranges are determined based on efficiencies of the processor core at each of respective different frequencies at which the processor core can run, each efficiency corresponding to a respective ratio between frequency and power consumption;
a thread importance determination module configured to determine an importance level of a first thread scheduled to run on the processor core, the importance level being one of multiple different importance levels that threads running on the processor core can have; and
a core frequency configuration module configured to select a frequency range associated with the importance level from among the different frequency ranges, wherein each frequency range comprises corresponding upper and lower frequencies within which the processor core is allowed to run to execute a thread; and to
configure the processor core to run at the frequency range while running the first thread;
wherein the importance levels include a first importance level and a second importance level that is lower than the first importance level, and wherein the frequency ranges are determined based on the efficiencies such that operation of the processor core in a frequency range associated with the second importance level is more efficient than operation of the processor core in a frequency range associated with the first importance level.

9. The computing device as recited in claim 8, the core frequency configuration module being further configured to determine the frequency range associated with the importance level for the first thread, each frequency range having been determined based on efficiency of the processor core at each of multiple different frequencies at which the processor core can run.

10. The computing device as recited in claim 8, the core frequency configuration module being further configured to select the frequency range associated with the importance level for the first thread based on an energy performance preference value, the energy performance preference value indicating to the processor core whether to prefer high performance or lower energy usage while running the first thread.

11. The computing device as recited in claim 8, further comprising a core parking module configured to determine a utilization factor of the processor core based at least in part on the importance levels of multiple threads run on the processor core over a given time duration, and to determine, based on the utilization factor of the processor core, whether to park the processor core.

12. The computing device as recited in claim 11, the core parking module being further configured to determine the utilization factor by excluding from consideration in determining the utilization factor one or more of the multiple threads having less than a threshold importance level.

13. The computing device as recited in claim 11, the determining the utilization factor comprising weighting, for each of the threads run on the processor core over the given time duration, the thread based on the importance level of the thread.

14. Computer-readable storage media storing information configured to cause a computing device to perform a process, the process comprising:
executing a workload of a processor core at each of respective different frequencies among frequencies at which the processor core can run;
programmatically determining, based on the executing, efficiencies of the processor core at each of the respective different frequencies, each efficiency corresponding to a respective ratio between frequency and power consumption;
determining frequency ranges based on the determined efficiencies, and associating the frequency ranges with importance levels, respectively, wherein each frequency range comprises corresponding upper and lower frequencies within which the processor core is allowed to run to execute a thread;
determining an importance level of a first thread scheduled to run on the processor core, the importance level being one of the importance levels;

selecting, from among the determined frequency ranges, a frequency range associated with the determined importance level;

configuring the processor core to run at the selected frequency range while running the first thread; and wherein the importance levels include a first importance level and a second importance level that is lower than the first importance level, and wherein determining the frequency ranges based on the determined efficiencies is such that operation of the processor core in a frequency range associated with the second importance level is more efficient than operation of the processor core in a frequency range associated with the first importance level.

* * * * *